United States Patent Office 3,586,515
Patented June 22, 1971

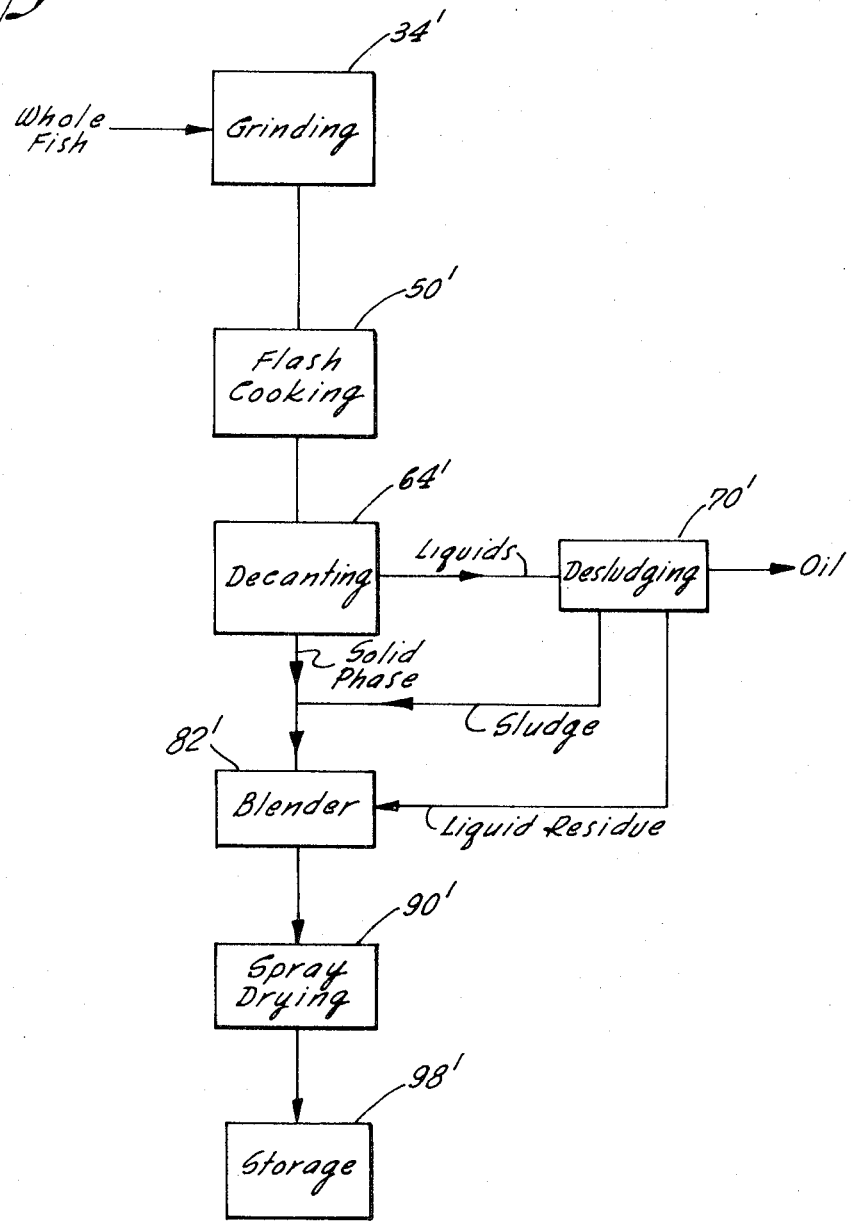

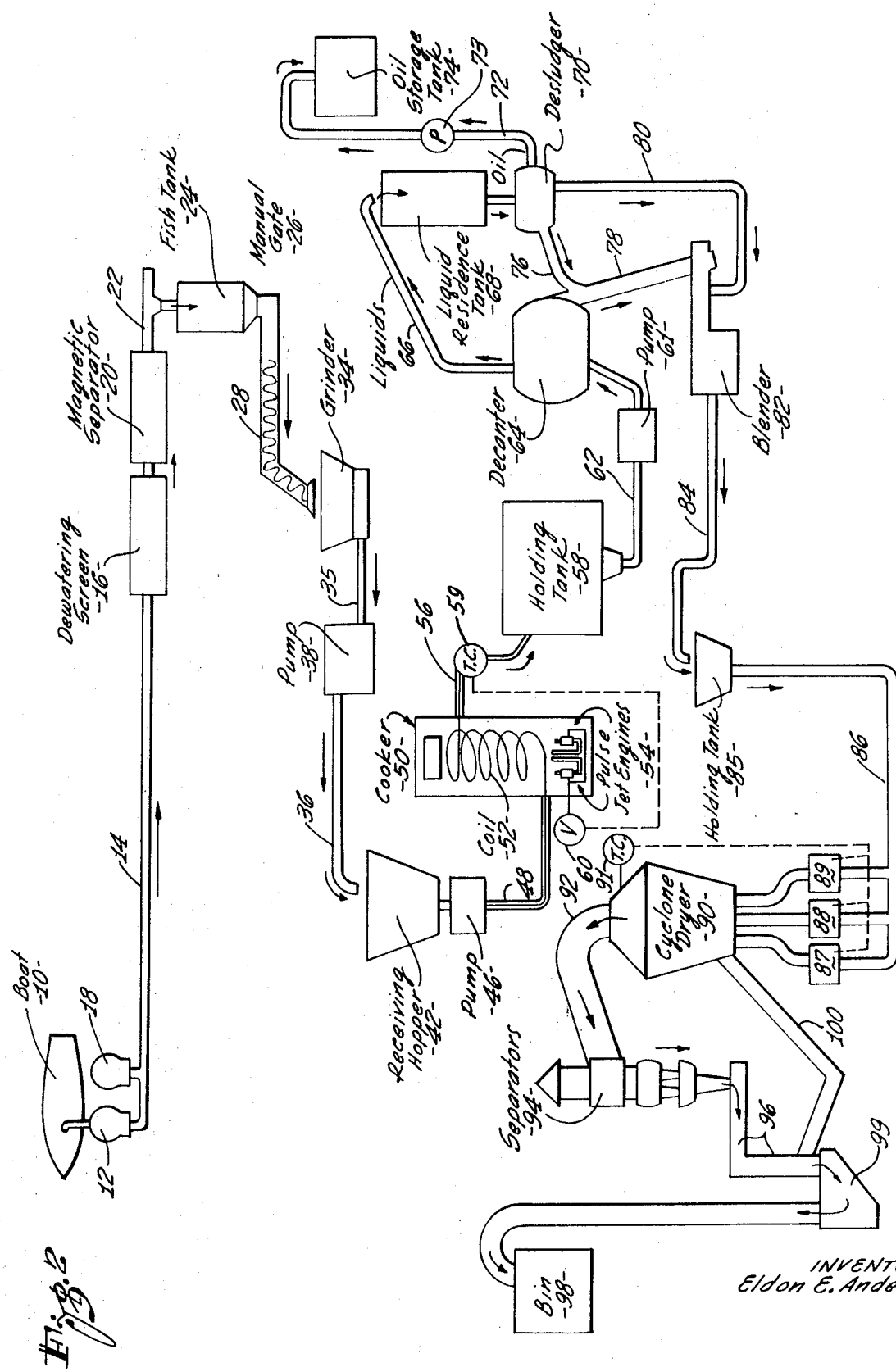

3,586,515
METHOD AND APPARATUS FOR CONVERTING BODIES INTO PARTICULATE MATTER
Eldon E. Anderson, Los Angeles, Calif., assignor to Marine Technology, Inc.
Filed Oct. 22, 1968, Ser. No. 769,509
Int. Cl. A23b 3/04
U.S. Cl. 99—209
9 Claims

ABSTRACT OF THE DISCLOSURE

Apparatus and process for the conversion of whole fish into fish meal and oil by grinding the whole fish to form a slurry; flash heating the ground fish to a temperature under its boiling point; holding the slurry for a time; centrifugally separating the slurry into a solid phase and a liquid phase; centrifugally separating the liquid phase into oil and a liquid residue; removing the oil; combining the liquid residue with the solid phase; and spray drying the combined material with a pulse jet engine to form fish meal particles.

BACKGROUND OF THE INVENTION

In the prior art, the conversion of whole fish to dried fish meal required multi-step processing with considerable handling and conveying of the material during the process from station to station. Conventionally, the fish are first cooked by steam and the whole cooked fish are then pressed to remove the oil and part of the moisture from the fish bodies. The cooked fish cake is then removed from the press and placed in a rotary drier to remove the rest of the moisture from the cake. The material is then removed from the rotary drier and ground into meal. The oil and water mixture which was removed at the press is then placed into a centrifuge for separation. The water from the centrifuge, called the stickwater, cannot be discarded since it contains much of the nutrients from the fish in the form of water-soluble proteins. These water-soluble proteins in the stickwater can either be returned to the fish meal by routing the stickwater to an evaporator and then to the rotary drier for drying with the fish cake from the press, or the stickwater can be retained independently of the fish meal for use as fertilizer or the like.

It is apparent that excessive handling is required in the prior art, necessitating more labor. Additionally only certain types of fish can be handled by the prior art system making operation of some facilities uneconomical during some seasons of the year.

It is accordingly an object of the invention to provide an improved method and apparatus for converting bodies having a solid, oil, and moisture content into particulate matter and oil.

It is another object of the invention to provide an improved method and apparatus for converting whole fish to fish meal or to fish meal and oil.

It is still another object of the present invention to provide a new and improved method and apparatus for converting whole fish to fish meal and oil efficiently and economically.

SUMMARY OF THE INVENTION

The above-mentioned objects of the present invention are accomplished by providing an apparatus comprising means for grinding a substance to form a slurry; means for quickly heating the slurry to a temperature under its boiling point; means for holding the slurry for a period of time; means for separating the slurry into a solid phase and a liquid phase; means for separating the liquid phase into oil and a liquid residue; means for combining said liquid residue with said solid phase; and means for spray drying the combined material into particulate matter. The invention also includes the process method performed by the above-named elements, that is, the method comprises the steps of grinding the substance to form a slurry; quickly cooking the slurry to a temperature under its boiling point; holding the slurry for a time; and spray drying the slurry into particulate matter.

BRIEF DESCRIPTION OF THE DRAWINGS

A better understanding of the invention can be had by the following specification when taken in conjunction with the drawings in which FIG. 1 shows a flow diagram of the method according to the invention; and FIG. 2 illustrates schematically and diagrammatically the process and apparatus for converting whole fish into fish meal and oil.

DESCRIPTION OF THE PREFERRED EMBODIMENT

Description of the apparatus

Referring now to the drawing, and particularly to FIG. 2, there is shown a boat 10 having removed from the hold thereof the whole fish by means of a fish pump 12 through a suitable pipe 14 to a de-watering screen 16. In order to efficiently utilize the fish pump 12, sea water is introduced into the system by means of a sea water pump 18, which assists in the transporting of the whole fish through the pipe 14. This water, along with the sea water taken in with the whole fish, is ultimately removed at the de-watering screen 16.

The whole fish is then transported through a magnetic separator 20 for removing any metal objects, such as fish hooks, onto a weighing conveyer 22, and into a suitable storage facility such as a fish tank 24. A gate 26 is provided at the lower end of the fish tank 24 for continuously feeding the whole fish onto a suitable transporting means 28 such as a screw conveyer. The fish are transported through the screw conveyer to a grinder 34 where the bodies are ground into a slurry. The ground bodies are transported through suitable conduits 35 and 36 by a positive displacement pump 38 from the grinder 34 to a receiving hopper 42. From the hopper 42 the slurry is pumped by means of another positive displacement pump 46 through a suitable conduit 48 into a flash cooker, generally designated 50. The fish slurry is transported in coil 52 through the cooker 50 during the heating operation. The term "slurry" is used to describe a watery mixture comprising particles of ground fish solid, water, blood and oil. The flash cooker comprises a series of stainless steel coils 52 through which the slurry is transported.

The coils 52 are heated by suitable heating means such as by two four-million B.t.u. per hour pulse jet engines 54. Such an engine is shown in U.S. Pat. No. 2,857,332, and a full description thereof is deemed unnecessary to the present invention inasmuch as other suitable flash heating means can also be employed. The term "flash cooker" is used to indicate an apparatus that heats the fish slurry very quickly, on the order of a few seconds, to a temperature between 190 and 210 degrees Fahrenheit, just below the boiling point of the slurry, which is primarily water based, so as to cook the fish slurry. The heated slurry is then discharged through a conduit 56 into an insulated holding tank 58. Temperature control of the cooker 50 is achieved by placement of a thermocouple 59 in the discharge conduit 56. The thermocouple controls a throttle valve 60 which in turn regulates the quantity of fuel fed to the pulse jet engines 54. The slurry remains in the holding tank 58 a sufficient time, generally on the order of several minutes, for removal of oil from the fish by allowing the breakdown of the fish fat cells so as to release the oil. From the holding tank 58 the slurry is pumped at a fixed rate of flow by means of a pump 61 through a conduit 62 to a decanter 64. The decanter 64 centrifugally separates the slurry into a solid phase and a liquid phase, the liquid phase comprising moisture, oil and suspended fine particles of solids. The liquid phase is then transported through a conduit 66 into a liquid residence tank 68 from whence it is then fed into a de-sludger 70. The de-sludger 70 centrifugally separates the oil from the liquid phase with the oil being transported by pump 73 through conduit 72 to a suitable storage tank 74. Suspended fine particles in the liquid phase, called sludge, are removed from the de-sludger 70 through conduit 76 to be combined with the solid phase from decanter 64 in a conduit 78. The remaining part of the liquid phase, known as stickwater, is conveyed through conduit 80 and is combined with the solids from conduit 78 in a blender-sizer 82 to make a uniform slurry containing the proteins and nutrients from the stickwater. The slurry is then ejected through a conduit 84 into a holding tank 85.

From the holding tank 85 the slurry is transported through a conduit 86 by three positive displacement pumps 87, 88 and 89 and fed to three corresponding pulse jet engines (not shown) located at the base of a cyclonic or spray drier generally designated 90. The details of the dried 90 are fully described in co-pending application, Ser. No. 574,202, filed Aug. 22, 1966, entitled "Drying Method and Apparatus" by Raymond M. Lockwood. Briefly, the drier 90 as disclosed in the above mentioned co-pending application has one pulse jet engine at its base, however, it is understood any suitable number of engines may be placed at the base of the drier. The slurry is injected into the jet's exhaust pipes where the oscillating flow of hot gases breaks up the slurry into particles which are then effectively dried by the heat of the gases. Four additional pulse jet engines are displaced around the periphery of the drier 90 at various angles to create a swirling, or cyclone effect to assist in the rapid drying of the particles. The pumping rate of the pumps 87, 88 and 89 is controlled by a temperature signal from a thermocouple 91 located at the upper end of the drier 90 so that the drier exhaust temperature is kept at a relatively constant level assuring proper drying of the particles. Finer particles are removed through the exhaust conduit 92 and are transported into a centrifugal separator 94 so as to separate the particles and the moist air. Coarser particles too heavy to be airborne out of the drier fall to the bottom of the drier where they are removed by a suitable conveying means 100, combined with fine particles removed by a suitable conveying means 96 such as a screw conveyor and deposited into a feeder bin 99 which feeds a pneumatic conveyor means 101 in communication with a storage bin 98 where the particles (fish meal) are deposited until packaging.

Description of the method

Referring now to FIG. 1, there is shown a flow chart illustrating the method of operation of the apparatus hereinbefore described. Briefly, the method includes grinding the whole fish in a grinder 34', flash cooking the ground fish in the cooker 50' and holding for a predetermined period of time, decanting the resulting slurry in a centrifugal decanter 64' which separates the slurry into a solid phase and a liquid phase. The liquid phase is fed into a de-sludger 70' which separates the oil out of the liquid phase leaving a liquid residue. The de-sludging further removes finely suspended solid particles known as "sludge" which is combined with the solid phase from the decanting operation to be fed into a blender 82' along with the liquid residue. The output of the blender is relatively homogeneous and is fed into a cyclone drier 90' for the spray drying operation whereby the mixture is fed into a flow of hot gases from a pulse jet engine. The finer particles are removed by means of a separator communicating with the top of the cyclone drier while the coarser particles fall to the bottom where they are removed and mixed with the fine particles in storage bin 98'.

The flash cooking step comprises increasing the temperature of the fish slurry to just below the boiling point of the slurry (about 212 degrees Fahrenheit) in a very short period of time, on the order of a few seconds. The slurry is then held in the insulated holding tank 58 for several minutes in order to break down the fish fat cells so that the fish oil is removed from the fish material. The proper time must be established by empirical methods as the time will vary, at least in part, according to the type of fish being processed. This entire procedure of cooking and holding could take less than 10 minutes; prior art methods took a considerably longer period of time. Additionally, by using the inventive method there is an improved separation of the oil from the fish when compared to the prior art.

In order to maintain a continuous process, provision must be made for time delays in the operation of the equipment. One of the principal factors which must be considered is the rate of removal of the oil from the liquid phase by the de-sludger 70, FIG. 2. It is consequently is necessary to have a liquid residence tank 68 which maintains a constant output flow to the de-sludger 70. Since it is very desirable that the flash cooker 50 have a uniform flow therethrough so that the pulse jet engines 54 may be operated at constant speed, it is necessary to provide the receiving hopper 42 at the input and a sufficiently large holding tank 58 at the output. The sufficiently large holding tank 58 further assures a uniform flow into the decanter 64, the flow rate being dependent upon the rate of removal of the oil. In addition, one or more fish tanks 24 are provided as a storage for fish in order to provide a sufficient volume of whole fish to maintain the receiving hopper 42 at an adequate level during the time that no boats are being unloaded.

In summary, it can be seen that there has been provided a fast, continuous, efficient method of converting whole fish to fish meal and oil. It is to be understood, however, that other adaptations and modifications may be made within the spirit and scope of the invention, such as by going directly from the holding tank 62 to the blender 82 if there is no need or if it is undesirable to remove the oil from the fish.

What is claimed is:
1. The method of converting a substance having a solid, non-oil, liquid and oil content into a particulate matter which comprises the steps of:
    (a) grinding the substance to form a slurry;
    (b) quickly cooking the slurry to a temperature under its boiling point;
    (c) holding the slurry for a predetermined time period;
    (d) separating the slurry into a solid phase and a liquid phase;
    (e) separating the liquid phase into oil and a liquid residue;
    (f) combining said liquid residue with said solid phase; and
    (g) spray-drying the slurry into a particulate material.
2. The method of claim 1 in which the spray drying step includes injecting the combined liquid residue and solid phase into a pipe having oscillating flow of hot gases therein.
3. The method of converting whole fish to fish meal and oil which comprises the steps of:
    (a) grinding the whole fish to form a slurry;
    (b) quickly cooking the slurry to a temperature beneath its boiling point;
    (c) holding the slurry for a time to break down the fish fat cells to release oil;
    (d) separating the slurry into a solid phase and a liquid phase;
    (e) separating the liquid phase into fish oil and liquid residue;

(f) combining said liquid residue with said solid phase; and (g) spray drying the combined liquid residue and solid phase into particles.

4. The combination according to claim 3 wherein said spray drying includes injecting the combined stickwater and solid phase into an oscillating flow of hot gases in a pipe.

5. The method of claim 4 in which the oscillating flow of hot gases is established by injecting the exhaust gases of a pulse jet engine into said pipe.

6. The method of claim 4 in which said pipe is the exhaust pipe of a pulse jet engine.

7. The method of converting bodies having a solid, non-oil, liquid and oil content to particulate material and oil, which comprises the steps of:
- (a) grinding the bodies to form a slurry;
- (b) quickly cooking the slurry to a temperature beneath its boiling point;
- (c) holding said slurry for a time to break down the fish fat cells to release oil;
- (d) centrifugally separating the slurry into a solid phase and a liquid phase;
- (e) centrifugally separating the liquid phase into oil and a liquid residue;
- (f) combining said liquid residue with said solid phase;
- (g) injecting the combined liquid phase and solid phase into a flow of hot gases to form a dried particulate material; and
- (h) recovering said dried particulate material from said flow of hot gases.

8. Apparatus for the continuous conversion of whole fish to fish meal and oil, said apparatus comprising:
- (a) means for grinding the whole fish to form a slurry;
- (b) means for quickly heating said slurry to a temperature beneath its boiling point;
- (c) means for holding the slurry for a period of time;
- (d) means for centrifugally separating the slurry into a solid phase and a liquid phase;
- (e) means for centrifugally separating the liquid phase into fish oil and a liquid residue;
- (f) means for combining said liquid residue with said solid phase; and
- (g) means for spray drying the combined material into particulate matter with an oscillating flow of gases.

9. Apparatus for converting bodies having a solid, non-oil, liquid and oil content into particulate matter and oil, said apparatus comprising:
- (a) means for grinding the bodies to form a slurry;
- (b) heating means for quickly cooking said slurry communicating wtih said grinding means;
- (c) means communicating wtih said heating means for regulating the flow of the slurry through said heating means to bring said slurry to a temperature beneath its boiling point;
- (d) holding means communicating with said coil means for receiving said slurry;
- (e) means communicating with said holding means for separating the slurry into a solid phase and a liquid phase;
- (f) means communicating with said slurry separating means for separating the liquid phase into oil and a liquid residue;
- (g) means communicating with said liquid phase separating means for removing said oil;
- (h) means communicating with said liquid phase separating means for combining said liquid residue with said solid phase; and
- (i) spray drying means communicating with said liquid residue, solid phase combining means for receiving the combined liquid and solid material with an oscillating flow of gases and for drying said material to form particulate matter whereby said particulate matter and said oil are independently removable from said apparatus.

References Cited

UNITED STATES PATENTS

| | | | |
|---|---|---|---|
| 2,953,457 | 9/1960 | Sanna | 99—209 |
| 3,139,342 | 6/1964 | Linskey | 99—2 |
| 3,252,962 | 5/1966 | Whaley | 99—209 |

ROBERT W. JENKINS, Primary Examiner

U.S. Cl. X.R.

99—112, 235